US006560628B1

(12) United States Patent
Murata

(10) Patent No.: US 6,560,628 B1
(45) Date of Patent: May 6, 2003

(54) APPARATUS, METHOD, AND RECORDING MEDIUM FOR SCHEDULING EXECUTION USING TIME SLOT DATA

(75) Inventor: Seiji Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,246

(22) Filed: Apr. 23, 1999

(30) Foreign Application Priority Data

Apr. 27, 1998 (JP) ............................................ 10-117504

(51) Int. Cl.$^7$ ................................................ G06F 9/00
(52) U.S. Cl. ........................ 709/103; 709/100; 709/102
(58) Field of Search ................................ 709/100, 101, 709/102, 103, 104, 105, 106, 107, 108

(56) References Cited

PUBLICATIONS

Scheduling Support for Concurrency and Parallelism in the Mach Operating System, David L. Black, May 1990.*

* cited by examiner

Primary Examiner—Majid A. Banankhah
(74) Attorney, Agent, or Firm—Frommer Lawrence & Haug LLP; William S. Frommer; Hans R. Mahr

(57) ABSTRACT

A scheduling method for use with a multi-thread system which is capable of time-sharing processing a plurality of threads is provided which can avoid the drawback of priority inversion, minimize the modification of a wait queue, and ensure the optimum use of the processing time of a CPU.

According to the present invention, a time slot data is assigned to each thread and the scheduling is carried out on the basis of the time slot data. As a processing time is imparted to the time slot data, the execution of the thread to which the time slot data is assigned is started. In case that a higher priority thread has to wait for the completion of the execution of a lower priority thread, the time slot data assigned to the higher priority thread is handled as a time slot data of the lower priority thread, hence allowing the execution of the lower priority thread to be started upon a processing time imparted to the time slot data.

12 Claims, 17 Drawing Sheets

APPARATUS, METHOD, AND RECORDING MEDIUM FOR SCHEDULING EXECUTION USING TIME SLOT DATA

FIELD OF THE INVENTION

The present invention relates to a scheduling apparatus for an operating system which is capable of time-sharing processing a plurality of executable subjects, a method for the scheduling, and a recording medium in which an operating system capable of time-sharing processing a plurality of executable subjects is stored.

BACKGROUND OF THE INVENTION

In a system which can run a number of executable subjects concurrently in time-sharing mode, the executable subjects are scheduled in order of priority levels attributed to the executable subjects respectively. More particularly, the executable subjects are queued in a wait queue depending on their priority levels so that the executable subject of the highest priority is executed first, and can thus be handled by a CPU (central processing unit) in the order of their priority levels. The executable subject may be a process, a task, a thread, or the like and in this specification, is illustrated as a thread. The system in which the executable subject is a thread is hence called a multi-thread system.

In such a multi-thread system, the order of importance of threads is defined by their priority levels which have been determined, e.g. when the threads were produced. The order is not limited to precedence for execution of a thread but, for example in time-slice scheduling, may be priority for a time slice of the processing time of a CPU imparted to a thread. In another case, the priority of a thread may be dynamically weighted with relation to the time consumption in the system and the processing time required for the thread.

With the use of an algorithm for scheduling in order of the priority, a drawback known as priority inversion may arise in the exclusive controlling of access to common resources. Such priority inversion is now explained referring to FIG. 1.

FIG. 1 is a diagram showing a typical attitude of the priority inversion. The priority inversion commonly occurs when a higher priority thread A enters a critical section CS1. It is noted that the critical section CS1 contains a resource commonly used by the thread A and a thread C.

It is assumed, as shown in FIG. 1, that when the thread C has entered the critical section CS1, the higher priority thread A is turned to its ready state. The execution of the thread C is thus interrupted and the execution of the thread A is started. However, because the thread C is present in the critical section CS1, the thread A has to wait until the thread C leaves from the critical section CS1. Accordingly, the thread A is in its wait state and, then, the execution of the thread C is started.

Under this condition, when a thread B of which the priority is between those of the thread A and the thread C is turned to its ready state before the thread C leaves from the critical section A, the priority inversion occurs. More specifically, even while the higher priority thread A is in its wait state, the execution of the thread B which is lower in the priority than the thread A is started. As the middle priority thread B has been turned to its ready state, the execution of the thread C is interrupted and the execution of the middle priority thread B is started. At the time, the thread A is still in its wait state. Since the relation between the thread A and the thread B is not defined except their priorities, the thread A will hardly presume how long its wait state lasts before its execution is resumed.

With the algorithm for scheduling in order of priority, such priority inversion may substantially occur causing a higher priority thread to wait for the completion of the execution of a lower priority thread. Also, when the priority inversion has once occurred, the duration of interruption of the execution of the higher priority thread will hardly be estimated. Failure of estimating the interruption time for a higher priority thread is critical for a real-time system (that is irresponsible if a process is not finished within a specific length of time).

For eliminating the drawback of priority inversion, priority inheritance schemes have been introduced (such as "Priority Inheritance Protocols: An Approach to Real-time Synchronization" by Lui Sha, Ragunathan Rajkumar, and John P. Lehoczky, Technical Report CMU-CS-87-181, the Computer Science Department of Carnegie Mellon University, November 1987). The priority inheritance scheme is designed in which when a higher priority thread is turned to its wait state due to the presence of a lower priority thread, the lower priority thread inherits the priority level of the higher priority thread.

FIG. 2 illustrates a scenario, similar to that of FIG. 1, except for a priority inheritance scheme is employed. With the priority inheritance scheme, when the execution of a thread C is started with a thread A being in the wait state, the priority level of the thread C is changed to a level equal to the priority level of the thread A. As a result, interruption of the execution of the thread C by the execution of a thread (for example, the thread B) of which the priority level is lower than that of the thread A will be prevented before the thread C leaves from a critical section CS1.

The priority inheritance scheme allows the thread C to be scheduled at the priority level of the thread A before it leaves from the critical section CS1. Accordingly, the waiting time before the thread A is allowed to enter the critical section CS1 is bounded within a period required for the thread C occupying the critical section CS1. This permits an estimation of the interruption period during which the execution of the higher priority thread A is suspended.

To implement the above described priority inheritance scheme, the following procedure has to be performed. It is noted that this procedure is explained for a case that the execution of the higher priority thread A is interrupted until the lower priority thread C explicitly leaves from the critical section CS1.

First, as it has been judged that the thread A has to wait before the thread C leaves from the critical section CS1, i.e. the thread A is turned to its wait state, the thread A is dequeued from a wait queue. Then, the priority level of the thread C is temporarily changed to a level equal to the priority level of the thread A and the thread C is queued in the wait queue according to its priority level. The threads queued in the wait queue are performed by a CPU in order of the priority levels. When the thread C is called, its execution is started. In case that the processing time imparted to the thread C ends up during the execution, the thread C is queued again in the wait queue according to its changed priority level (equal to the priority level of the thread A).

When the wait state of the thread A is resolved (i.e. the thread C has left from the critical section CS1), the priority level of the thread C is turned back to its original lower level and the thread C is queued in the wait queue according to its original lower priority level. Simultaneously, the execution of the thread A becomes ready and queued back in the wait queue.

By following the foregoing procedure, the priority inheritance scheme shown in FIG. 2 is implemented where the interruption of the execution of the thread C by a thread (for example, the thread B) of which the priority level is lower than that of the thread A can be avoided before the thread C leaves out from the critical section CS1.

In a conventional scheduling system, the location in the wait queue of a thread to be queued is determined by its priority level at the time. Because the priority level is changed dynamically and frequently in the priority inheritance scheme, it is necessary to modify the wait queue at short intervals of time. Therefore, the use of the priority inheritance scheme requires modification or rescheduling of the wait queue to respond to the dynamic change of the priority level, hence resulting in increase of the overhead.

More particularly, the priority inheritance scheme is effective to eliminate the drawback of priority inversion, but demands for dynamically changing the priority level at high frequency thus increasing the overhead due to rescheduling and declining the overall performance of the system.

Also, in case that the priority is not just the order of execution of a thread but the ratio of use of the processing time of the CPU, i.e. the time-sharing scheduling is employed, changing the priority level of an interrupting thread (the thread C in the example) to a level equal to the priority level of a waiting thread (the thread A in the example) will discourage the optimum use of the processing time imparted to each thread.

More specifically, when the priority level of the thread C for example is set equal to the priority level of the thread A, the execution of the thread C is started with the priority level of the thread A and its processing time by the CPU is equal to the time imparted to the thread A but not the thread C. Accordingly, for implementing the optimum use of the overall processing time of the CPU, a sum of the time imparted to the waiting thread A and the time imparted to the interrupting thread C has to be calculated and imparted as the modified processing time to the thread C. In other words, it is essential for the time-sharing scheduling that the priority level corresponding to a sum of the processing time imparted to the thread A and the processing time imparted to the thread C is determined and assigned to the thread C.

However, such rescheduling by calculating the processing time imparted to each thread results in increase of the overhead during the execution. Accordingly, the conventional priority inheritance scheme will hardly ensure the optimum use of a processing time of the CPU imparted to each thread.

SUMMARY OF THE INVENTION

The present invention has been developed in view of the foregoing aspects and its object is to provide an apparatus and a method for scheduling in which the drawback of priority inversion can be resolved. Using the scheduling apparatus or method of the present invention, modification of the wait queue which may cause overhead can be minimized and a shared processing time of a CPU can be effectively used. Another object of the present invention is to provide a recording medium in which a data processing program of an operating system capable of time-sharing processing a plurality of executable subjects.

A scheduling apparatus according to the present invention for an operating system which is capable of time-sharing processing a plurality of executable subjects is provided comprising: a means for storing a time slot data which is assigned as the object to be scheduled to each of the executable subjects; a scheduler for imparting a processing time to the time slot data and conducting time-sharing scheduling; a means for executing the executable subject specified by the time slot data to which the processing time is imparted; a means for, when a first executable subject having a higher priority level has to wait for the completion of the execution of a second executable subject having a lower priority level, assigning the time slot data specifying the first executable subject to the second executable subject; and a means for, when the execution of the second executable subject is completed, assigning again the time slot data specifying the first executable subject to the first executable subject.

The scheduling apparatus of the present invention allows the time slot data to be designated separately of the executable subject and subjected to the scheduling, whereby when the executable subject of a higher priority level has to wait for the completion of the execution of the executable subject of a lower priority level, the priority inheritance can be carried out by implementing transfer of the time slot data which is low in the cost.

Also, another scheduling apparatus according to the present invention for an operating system which is capable of time-sharing processing a plurality of executable subjects is provided comprising: a means for storing a time slot data which is assigned as the object to be scheduled to each of the executable subjects; a scheduler for imparting a processing time to the time slot data and conducting time-sharing scheduling; a ring buffer composed of a plurality of wait queues, each permitting at least one time slot data to be allocated thereto; a means for executing the executable subject specified by the time slot data to which the processing time is imparted; a positioning means for determining one of the wait queues in the ring buffer, to which the time slot data is allocated, depending on a priority level of the executable subject specified by the time slot data; a means for, when allocation of the time slot data to the determined wait queue in the ring buffer is desired, allocating the time slot data to the last of the wait queue in the ring buffer; and a means for imparting the processing time to a time slot data located at the top of the wait queue in the ring buffer.

The another scheduling apparatus of the present invention allows the location in the ring buffer, to which the time slot data is allocated, to be determined depending on the priority level of the executable subject specified by the time slot data and commonly used by different time slot data of the same priority level. Consequently, the processing time of the CPU can effectively be shared by the executable subjects specified by their respective time slot data according to the priority level oft heir time slot.

Also, a scheduling method according to the present invention for use with an operating system which is capable of time-sharing processing a plurality of executable subjects is provided comprising the steps of: imparting a processing time to a time slot data which is assigned as the object to be scheduled to each of the executable subjects and conducting time-sharing scheduling; executing the executable subject specified by the time slot data to which the processing time is imparted; when a first executable subject having a higher priority level has to wait for the completion of the execution of a second executable subject having a lower priority level, assigning the time slot data specifying the first executable subject to the second executable subject; and when the execution of the second executable subject is completed, assigning again the time slot data specifying the first executable subject to the first executable subject.

The scheduling method of the present invention allows the time slot data to be designated separately of the executable subject and subjected to the scheduling, whereby when the executable subject of a higher priority level has to wait for the completion of the execution of the executable subject of a lower priority level, the priority inheritance can be carried out by implementing transfer of the time slot data which is low in the cost.

Another scheduling method according to the present invention for use with an operating system which is capable of time-sharing processing a plurality of executable subjects is provided comprising the steps of: imparting a processing time to a time slot data which is assigned as the object to be scheduled to each of the executable subjects and conducting time-sharing scheduling; executing the executable subject specified by the time slot data to which the processing time is imparted; determining one of wait queues provided in a ring buffer, to which the time slot data is allocated, depending on a priority level of the executable subject specified by the time slot data; when allocation of the time slot data to the determined wait queue in the ring buffer is desired, allocating the time slot data to the last of the wait queue in the ring buffer; and imparting the processing time to a time slot data located at the top of the wait queue in the ring buffer.

The another scheduling method of the present invention allows the location in the ring buffer, to which the time slot data is allocated, to be determined depending on the priority level of the executable subject specified by the time slot data and commonly used by different time slot data of the same priority level. Consequently, the processing time of the CPU can effectively be shared by the executable subjects specified by their respective time slot data according to the priority level of their time slot.

A recording medium according to the present invention in which a data processing program of an operating system which is capable of time-sharing processing a plurality of executable subjects is recorded is featured by the data processing program comprising the steps of: imparting a processing time to a time slot data which is assigned as the object to be scheduled to each of the executable subjects and conducting time-sharing scheduling; executing the executable subject specified by the time slot data to which the processing time is imparted; when a first executable subject having a higher priority level has to wait for the completion of the execution of a second executable subject having a lower priority level, assigning the time slot data specifying the first executable subject to the second executable subject; and when the execution of the second executable subject is completed, assigning again the time slot data specifying the first executable subject to the first executable subject.

Another recording medium according to the present invention in which a data processing program of an operating system which is capable of time-sharing processing a plurality of executable subjects is recordedis featured by the data processing program comprising the steps of: imparting a processing time to a time slot data which is assigned as the object to be scheduled to each of the executable subjects and conducting time-sharing scheduling; executing the executable subject specified by the time slot data to which the processing time is imparted; determining one of wait queues provided in a ring buffer, to which the time slot data is allocated, depending on a priority level of the executable subject specified by the time slot data; when allocation of the time slot data to the determined wait queue in the ring buffer is desired, allocating the time slot data to the last of the wait queue in the ring buffer; and imparting the processing time to a time slot data located at the top of the wait queue in the ring buffer.

According to the present invention, the time slot data assigned to a higher priority thread is used as a time slot data of a lower priority thread thus permitting the priority level of the higher priority thread to be transferred to the lower priority thread. As a result, the drawback of priority inversion will be resolved.

Also, according to the present invention, the priority inheritance is implemented by handing the time slot data assigned to the higher priority thread as the time slot data of the lower priority thread. This resolves frequent modification of the wait queue in the priority inheritance. Therefore, the priority inheritance can be conducted without proceeding frequent modification of the wait queue which may increase undesirable overhead.

Furthermore, according to the present invention, when the priority level has been transferred from the higher priority thread to the lower priority thread, both the processing time imparted to the higher priority thread and the processing time imparted to the lower priority thread can be utilized equally. In other words, a slice of the processing time imparted to each thread can be used at high efficiency.

BEST MODES FOR EMBODYING THE INVENTION

Figure 1:
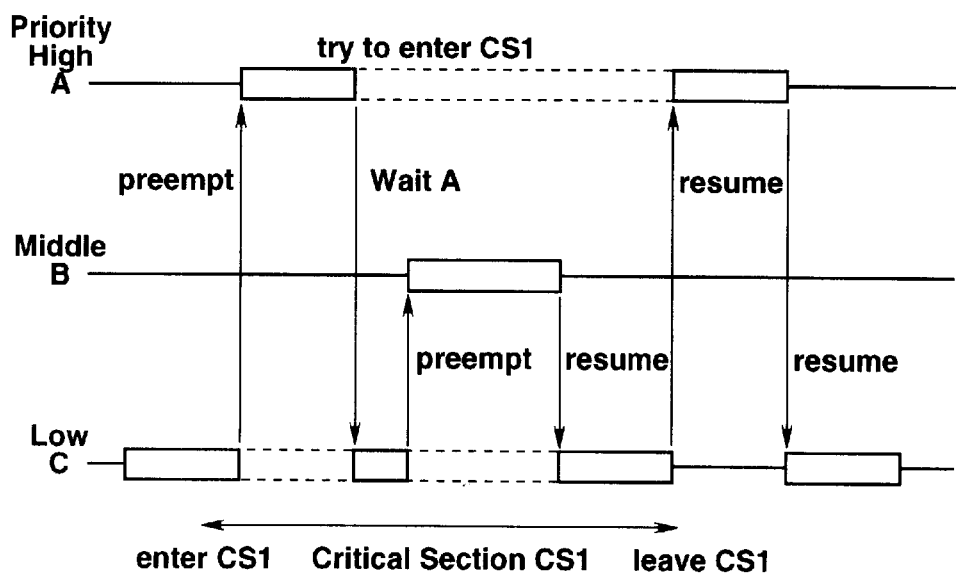
FIG. 1 is a diagram explaining the drawback of priority inversion.
Figure 2:
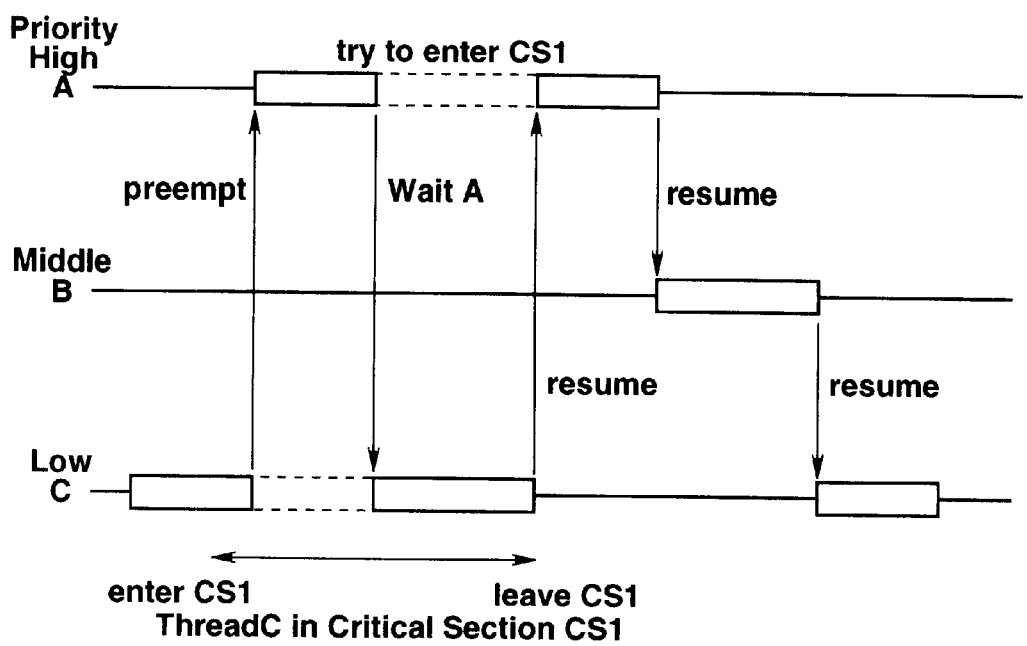
FIG. 2 is a diagram explaining a priority inheritance scheme.

Embodiments of the present invention will be described in more detail referring to the accompanying drawings.

In an operating system capable of time-sharing processing a plurality of executable subjects, the present invention allows a time slot to be allocated to each thread and its time slot data specifying the thread to be used for the scheduling. More specifically in the present invention, the thread is not a target to be scheduled but it is specified by the time slot data which is then handled for the scheduling. When a processing time is imparted to the time slot data, the execution of the thread specified by the time slot data is started.

The time slot data is an indirect representative of the priority level of each thread. The time slot data includes information linked to a thread which is executed when a processing time of the CPU is imparted to the time slot data. The operating system performs a scheduling operation on the basis of not a thread but a time slot data. Upon the processing time of the CPU being imparted to the time slot data, the execution of the thread represented by the time slot data is started.

According to the present invention, the inheritance of the priority level is implemented by dynamically modifying the relation between a thread and its time slot data. More particularly, in case that a higher priority thread has to wait for the completion of the execution of a lower priority thread, the time slot data representing the higher priority thread is treated as the time slot data of the lower priority thread. When a processing time is then imparted to the latter time slot data, the execution of the lower priority thread is started.

It should be understood that the present invention is applicable not only to exclusive control operation on access to common resources but also to synchronization-based message communications in an object-oriented operating system or any wait event in which threads are dependent on one another such as waiting for a particular event.

One embodiment of the present invention is now explained explicitly in the form of a scheduling method. The scheduling method may be employed in a scheduling apparatus for an operating system which is capable of time-sharing processing a plurality of threads. A recording medium in which the operating system is stored is another embodiment of the present invention.

1. Data used for Scheduling

Before describing the scheduling method, the data used in the scheduling method is explained.

In the scheduling method of the present invention, a time slot data is specified to represent a corresponding thread and used for the scheduling. More particularly, the time slot data assigned to a thread is determined upon producing the thread. Simultaneously, a storage area for storing data of the thread (referred to as a thread data hereinafter) is registered, for example, on an external memory device 10 shown in FIG. 26. Also, a storage area for storing the time slot data may be registered on the external memory device 10 shown in FIG. 26.

TABLE 1

A list of thread data
ThreadState state
Thread* depend
Threadlist inherit
TimeSlot* timeSlot As shown in Table 1, the thread data includes a variable, "state", of ThreadState type indicative of the state of a thread, a variable, "depend", of Tread* type for specifying the thread data, a variable, "inherit", of ThreadList type for entry to a thread list, and a varibale, "timeSlot", of TimeSlot* type for specifying the time slot.

The variable "state" is set to a value representing the state of the thread. The thread is classified into three states: a state of the thread being arrested (referred to as an arrested state hereinafter), a state of the thread being suspended by an interrupting event (referred to as a wait state), and a state of the thread becoming ready (referred to as a ready state). The variable "state" is indicative of one of the three states. The execution of the thread is started only when it is in its ready state. In other words, a processing time of the CPU is imparted to the time slot when the thread assigned to the time slot is in its ready state.

The variable "depend" is used when the thread is in its wait state and set to a value indicating an interrupting thread which causes the thread to wait for the completion of the execution of the interrupting thread. Otherwise, the variable "depend" is set to NULL.

The variable "inherit" is used when the priority level of the thread is transferred or inherited from another thread and set to a value indicating the another thread from which the priority level is inherited. In other words, the variable "inherit" expresses that the thread of interest is in its wait state to wait for the completion of the execution of the interrupting thread. If there is no inheritance of the priority level, the variable "inherit" is set to NULL.

In some cases, two or more of threads are in the wait state and queued in a thread list. The variable "inherit" is hence used for entry to the thread list. In practice, the value of the variable "inherit" indicates not the another thread from which the priority level is inherited but the thread list in which the waiting threads are listed.

The variable "timeSlot" is set to a value indicating the time slot data which has been linked to the thread at the initial stage. In other words, the variable "timeSlot" is a link data representing the time slot data of the thread.

In the thread data, "depend" and "inherit" represent link data to a piece of information related to the priority inheritance. For example, when the thread A is in the wait state before the execution of the thread B is completed, the variable "depend" in the thread data of the thread A and the variable "inherit" in the thread data of the thread B are associated with each other forming a two-directional link. It is noted that the variable in the thread data of a thread is referred to as a variable of the thread in the following description. Also, the thread data may be called a thread for ease of the description.

TABLE 2

A list of time slot data
Thread* owner
Priority prio
TimeSlot* next

As shown in Table 2, the time slot data includes a variable, "owner", of Thread* type for specifying the thread, a variable, "prio", of Priority type for specifying the priority level, and a variable, "next", of TimeSlot* type for specifying the time slot data.

The variable "owner" is set to a value indicating the thread of which the execution has to be started when the processing time of the CPU is imparted to the time slot data. In other words, the variable "owner" is a link data representing the thread specified by the time slot data.

In the scheduling described below, a priority inheritance is in effect conducted by changing a thread specified by a variable "owner" and hence by changing a thread for which the processing time of the CPU is imparted. More specifically, when a processing time of the CPU is imparted to the time slot data, the execution of the thread indicated by the variable "owner" of the time slot data is started. The priority inheritance is thus implemented by modifying the variable "owner" instead of directly operating on the wait queue.

The variable "prio" is set to a value indicating the priority level. In the scheduling described below, the processing time of the CPU imparted to the time slot data is determined according to the variable "prio". The variable "prio" remains intact even when the thread denoted by the variable "owner" is replaced. More specifically, when the thread denoted by the variable "owner" is replaced, the variable "prio" stays at a value indicating the priority level of the thread specified by the time slot data.

The variable "next" is set to a link to the time slot data to which the processing time of the CPU is imparted next time. More particularly, when a processing time of the CPU imparted to the time slot data has been consumed, another processing time of the CPU is imparted to the time slot data indicated by the variable "next" of the time slot data.

2. Procedure After Changing a State of Thread to Wait State

The procedure when a higher priority thread has been changed to the wait state to wait for the completion of the execution of a lower priority thread is now explained. To start the procedure after changing a state of the higher priority thread to the wait state to wait for the completion of the execution of the lower priority thread, a function "makeWait (Thread* target, Thread* depend)" is called. The first argument "target" of the function "makeWait (Thread* target, Thread* depend)" is of Thread* type. The argument "target" is set to a value indicating the thread which is turned to the wait state to wait for the completion of the execution of a lower priority thread. The second argument "depend" is also of Thread* type. The argument "depend" is set to a value indicating the lower priority thread which causes the thread at a higher priority to be in the wait state.

Figure 3:
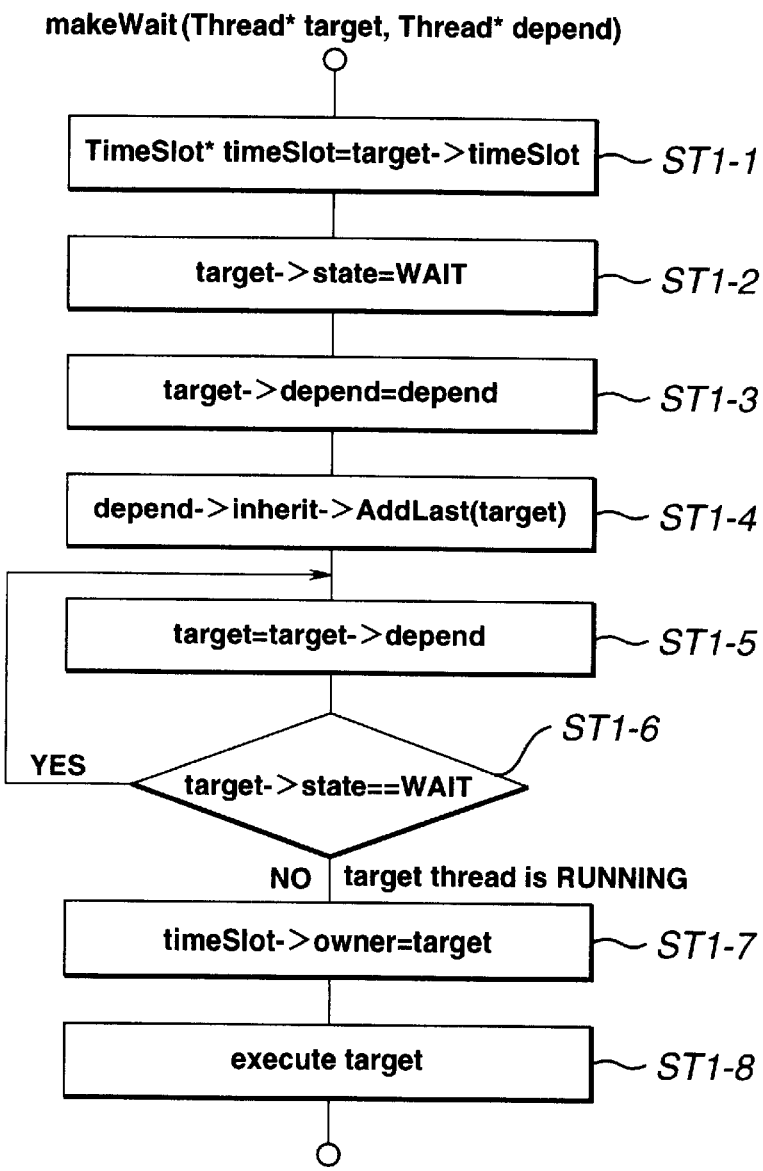
FIG. 3 is a flowchart showing a procedure of calculating the function "makeWait (Thread* target, Thread* depend)" called when a thread of interest is turned to its wait state.

A series of steps starting after the function "makeWait (Thread* target, Thread* depend)" is called is explained referring to the flowchart shown in FIG. 3. The steps of the flowchart shown in FIG. 3 are denoted using terms of the C language.

As the function "makeWait (Thread* target, Thread* depend)" has been called, the variable "timeSlot" of timeSlot* type is set to a value of the variable "timeSlot" of the thread denoted by the argument "target" at Step ST1-1.

This is followed by Step ST1-2 where the variable "state" of the thread denoted by the argument "target" is set to a value "WAIT" which indicates that the thread is in the wait state.

At Step ST1-3, the variable "depend" of the thread denoted by the argument "target" is set to a value of the argument "depend". This allows a thread which causes the thread at a higher priority to be in the wait state to be referred with the use of the variable "depend".

Then, at Step ST1-4, the thread denoted by the argument "target" is added to the end of the thread list denoted by the variable "inherit" of the thread denoted by the argument "depend". As shown in FIG. 3, "AddLast (target)" represents a function for adding a thread to the end of the thread list. This allows the variable "inherit" to be used for referring to the thread list in which the higher priority thread of which the time slot data is targeted.

At Step ST1-5, the argument "target" is modified to a value of the variable "depend" of the thread denoted by the argument "target". This allows the argument "target" to be used for referring to a thread which may be a candidate to be executed.

It is then examined at Step ST1-6 whether or not the variable "state" of the thread denoted by the argument "target" is set to WAIT which represents that the thread is in the wait state. When the variable "state" is set to WAIT, the procedure returns back to Step ST1-5. When the variable is not set to WAIT, the procedure goes to Step ST1-7. Steps ST1-5 and ST1-6 are repeated until a thread which is not in the wait mode is found.

At ST1-7, the variable "owner" of the time slot denoted by the variable "timeSlot" is set to a value of the modified argument "target". This allows the priority level expressed indirectly by the time slot data to be switched from the higher priority thread to the lower priority thread.

Finally at Step ST1-8, the execution of the thread denoted by the modified argument "target" is started.

As a result, while the higher priority thread is in its wait state, the execution of the lower priority thread is started. At the time, the variable "depend" of the higher priority thread and the variable "inherit" of the lower priority thread are associated forming a pair of mutual links for waiting for the execution.

In case that the lower priority thread which causes the wait state of the higher priority thread is in its wait state to wait for the completion of the execution of another lower priority thread, repeating of Steps ST1-5 and ST1-6 permits the argument "target" to be further modified until its value indicates the further lower priority thread. Accordingly, the execution of the further lower priority thread is started. In other words, the execution of the function "makeWait "(Thread* target, Thread* depend)" causes the variable "owner" of the time slot data specifying the higher priority thread to be modified for identifying an executable thread.

In the scheduling method of the present invention, when a processing time of the CPU is imparted to the tile slot data, the execution of the thread denoted by the variable "owner" of the time slot data is started. Accordingly, by modifying the variable "owner", the processing time of the CPU imparted to the higher priority thread data specifying the variable "prio" of the time slot data can be appropriated for the lower priority thread to be executed first. This will permit the lower priority thread to practically inherit the priority level of the higher: priority thread.

3. Procedure After Wait State of Thread is Eliminated

The procedure when the execution of a lower priority thread has been finished with a higher priority thread remaining in the wait state to wait for the completion of the execution of the lower priority thread and the wait state of the higher priority thread is thus canceled is now explained.

When the execution of the lower priority thread has completed and the wait state of the higher priority thread is resolved, a function "makeReady (Thread* target)" is called. The argument "target" of the function "makeReady (Thread* target)" is of Thread* type and is set to a value indicating the thread of which the wait state is resolved.

Figure 4:
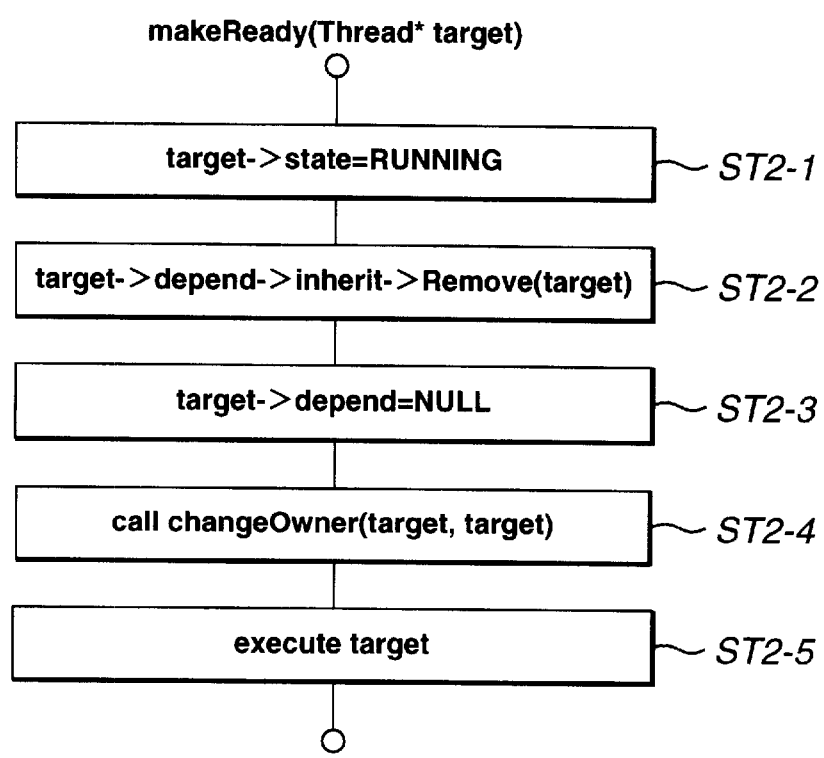
FIG. 4 is a flowchart showing a procedure of calculating the function "makeRead (Thread* target)" called when the wait state of a thread of interest is canceled.

The procedure starting with the function "makeReady (Thread* target)" called is explained referring to the flow-chart shown in FIG. 4. Steps in the flowchart shown in FIG. 4 are expressed using terms of the C language.

As the function "makeReady (Thread* target)" has been called, the variable "state" of the thread denoted by the argument "target" is set at Step ST2-1 to RUNNING which is a value indicating that the thread is in the ready state.

This is followed by Step ST2-2 where the link to the thread denoted by the argument "target" is removed by a function "Remove(target)" from the thread list related to the variable "inherit" of the inheriting thread which inherited the time slot data of the thread denoted by the argument "target". This allows the time slot data to be transferred back from the inheriting thread.

At Step ST2-3, the variable "depend" of the thread denoted by the argument "target" is set to NULL. In other words, the completion of the execution of the inheriting thread which causes the wait state of the thread results in no need of the wait state.

At Step ST2-4, the argument "target" transferred to the function "makeReady (Thread* target)" is modified to be equal to the first argument and the second argument for calling a function "changeOwner (Thread* target, Thread* depend)". This causes the time slot data specifying the higher priority thread to be transferred back from the inheriting thread to the higher priority thread. As a result, the thread of interest can associate with its time slot data. The variable "owner" of the time slot data in the function "changeOwner (Thread* target, Thread* depend)" may be modified. Such modification will be described later in more detail. After the execution of the function "changeOwner (Thread* target, Thread* depend)", the procedure advances to Step ST2-5.

Finally at Step ST2-5, the execution of the thread denoted by the argument "target" is started.

Using the function "makeReady (Thread* target)", a state of the higher priority thread is changed from the wait state to the ready state. Hence, the execution of the higher priority thread can be started.

Figure 5:
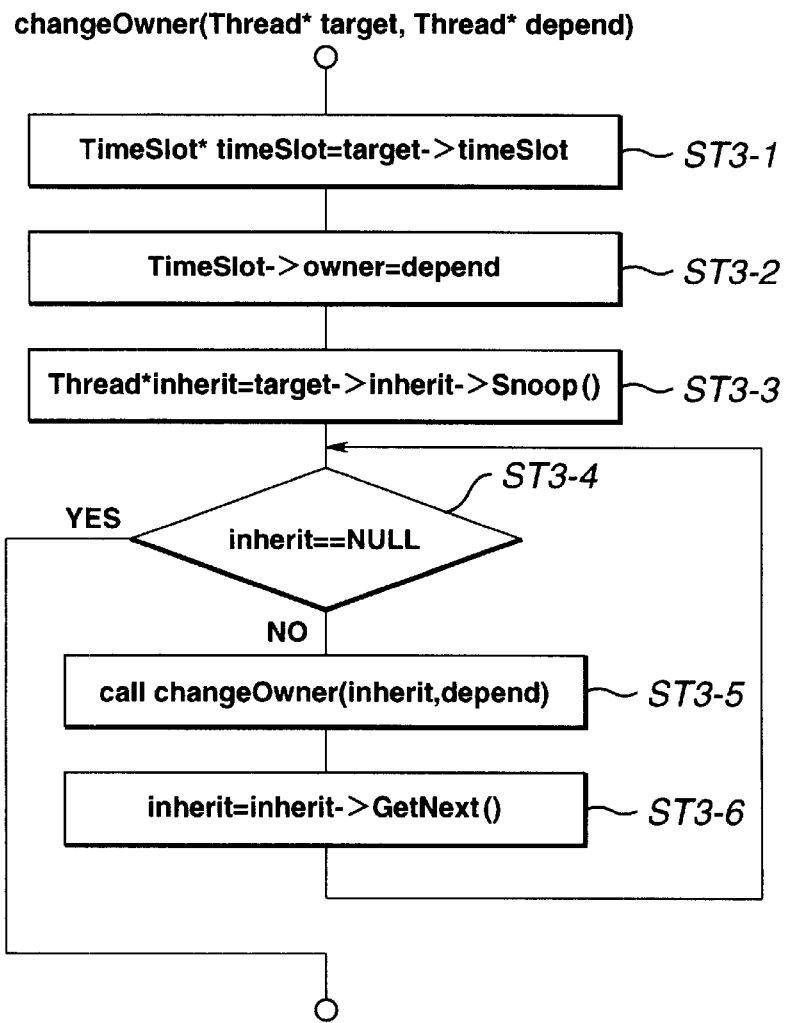
FIG. 5 is a flowchart showing a procedure of calculating the function "changeOwner (Thread* target, Thread* depend)" called in "makeReady (Thread* target)"; while FIGS. 6 to 13 illustrating waiting patterns over a row of wait queues when no priority inheritance is involved.
Figure 6:
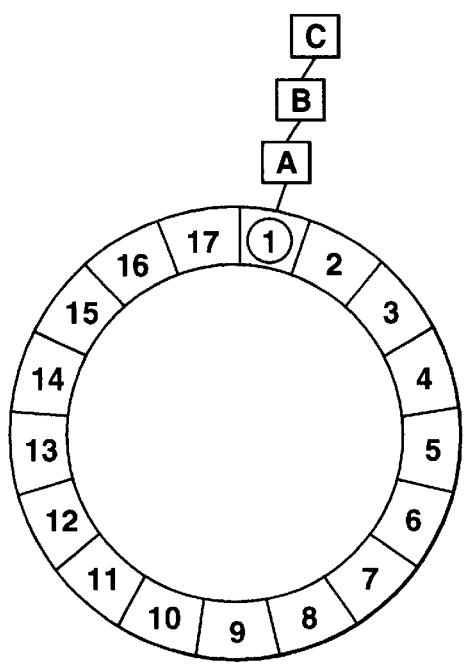
FIG. 6 is a diagram showing three time slot data A, B, and C queued in the first wait queue.

A series of steps when the function "changeOwner (Thread* target, Thread* depend)" has been called is now explained referring to the flowchart shown in FIG. 5. The steps of the flowchart shown in FIG. 5 are expressed using terms of the C language.

Both the first argument "target" and the second argument "depend" in the function "changeOwner (Thread* target, Thread* depend)" are of Thread* type. The variable "owner" of the time slot data of the argument "target" is modified by the function "changeOwner (Thread* target, Thread* depend)" to be equal to the argument "depend".

As the function "changeOwner (Thread* target, Thread* depend)" has been called, the variable "timeSlot" of TimeSlot* type is set at Step ST3-1 to a value of the variable "timeSlot" of the thread indicated by the argument "target".

This is followed by Step ST3-2 where the variable "owner" of the time slot denoted by the variable "timeSlot" is set to a value of the argument "depend". This allows the occupation of the time slot to be switched to the thread denoted by the argument "depend".

At Step ST3-3, the thread listed at the top of the thread list denoted by the variable "inherit" of the thread denoted by the argument "target" is set with a value of the variable "inherit" of Thread* type. If the thread list carries no thread, the variable "inherit" is set to NULL.

Snoop( ) shown in FIG. 5 represents a function for extracting the thread listed at the top of the thread list. The function "Snoop( )" returns a value indicating the thread listed at the top of the thread list as the return value.

It is then examined at Step ST3-4 whether or not the variable "inherit" is set to NULL. When the variable "inherit" is set to NULL, the procedure with the function "changeOwner (Thread* target, Thread* depend)" is ended. When the variable "inherit" is not NULL, the procedure goes to Step ST3-5.

At Step ST3-5, the variable "inherit" is modified to be equal to the first argument and also the argument "depend" is modified to be equal to the second argument for calling a function "changeOwner (Thread* inherit, Thread* depend)". When the execution of the function "changeOwner (Thread* inherit, Thread* depend) is completed, the procedure advances to Step ST3-6.

At Step ST3-6, another thread denoted by the modified argument "inherit" is set with a value of the variable "inherit". When no thread is involved, the variable "inherit" is set to NULL. When the process at Step ST3-6 is completed, the procedure returns back to and repeats Steps ST3-4.

By execution of the function "changeOwner (Thread* target, Thread* depend)", the variable "owner" of the time slot data is modified and the waiting link developed by the variable "depend" of the higher priority thread and the variable "inherit" of the lower priority thread is canceled.

In many cases, two or more threads are in the wait state before the execution of a lower priority thread is completed and are listed in the thread list. Hence, all the threads in the thread list are subjected to modifying the variable "owner" of their time slot data by repeating Steps ST3-4 to ST3-6 using the function "changeOwner (Thread* target, Thread* depend)".

4. Example of Scheduling

A practical example of the scheduling is now explained referring to FIGS. 6 to 25.

The example is a time-slice scheduling where the priority level of a thread represents a time slice of the processing time of the CPU to be imparted to the thread. Also, the example is based on a round robin scheduling algorithm weighted by the priority.

The scheduling starts with assigning a time slot data determined by the priority level to a corresponding thread. It is assumed that the priority level ranges from 15 to 0. The variable "prio" of the time data slot is set to a value ranging from 15 to 0 depending on the priority level of the corresponding thread. The levels 15 to 0 are equal to 1, ½, ⅓, . . . , ¹⁄₁₆ the ratio of the processing time of the CPU respectively.

The time slot data of the threads are saved in a ring buffer which has 17 wait queues. The time slot data are then selected in sequence from each wait queue. A processing time of the CPU is imparted to each of the selected time slot data and the execution of a thread corresponding to the time slot data is started.

The time slot data to which the processing time of the CPU is imparted, when its corresponding thread has consumed the processing time, is queued to a forward wait queue which is determined by the priority level denoted by the variable "prio" of the time slot data. By referring to the priority level to determine the forward wait queue in the ring buffer to which the time slot data is queued, a time slice of the processing time of the CPU can be obtained.

The present invention is not limited to the above described example based on such round robin scheduling algorithm but may be applicable to any other scheduling method such as utilizing the priority level to carry out an FCFS (first come first served) operation. Among the other scheduling methods with priority-based FCFS operations are employing particular algorithms "Rate Monotonic" (by John Lhoczky, Lui Sha, and Ye Ding, The rate monotonic scheduling algorithm: Exact characterization and average case behavior, Technical Report 1987, the Department of Statistics of the Carnegie Mellon University) and "Earliest Deadline First".

4-1. When no Priority Inheritance is Involved

An example for time-sharing processing the thread A having a priority level of 15, the thread B having a priority level of 13, and the thread C having a priority level of 3 with no involvement of the priority inheritance is now explained referring to FIGS. 6 to 15. In FIGS. 6 to 15 and FIGS. 16 to 25, the numerals 1 to 17 represent the 17 wait queues respectively. The numeral with a circle mark indicates that the wait queue denoted by the numeral is to be examined.

The time-sharing processing of the threads A, B, and C starts with listing their time slot data A, B, and C in the first wait queue. More particularly, the time slot data B is denoted by the variable "next" of the time slot data A and the time slot data C is denoted by the variable "next" of the time slot data B. As illustrated, the time slot data A is a time slot data specifying the thread A, the time slot data B is a time slot data specifying the thread B, the time slot data C is a time slot data specifying the thread C.

A processing time of the CPU is first assigned to the time slot data A which is located at the top of the first wait queue, allowing the execution of the thread corresponding to the time slot data A to be started. The thread corresponding to the time slot data A is a thread denoted by the variable "owner" of the time slot data A.

Figure 7:
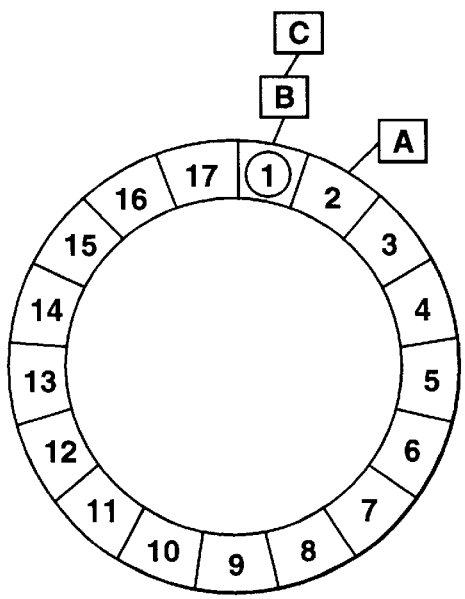
FIG. 7 is a diagram showing the time slot data A, B, and C shifted from the waiting pattern shown in FIG. 6.

As the processing time assigned to the time slot data A has been consumed, the time slot data A is queued to a forward wait queue determined by its priority level. More particularly, as the priority level of the thread A is 15, the time slot data A is queued to a forward wait queue advanced by (16−15)=1 from the current wait queue, i.e. the second wait queue as shown in FIG. 7.

Then, another processing time of the CPU is assigned to the time slot data B in the first wait queue which succeeds the time slot data A, permitting the execution of the thread B corresponding to the time slot data B to be started. The thread B corresponding to the time slot data B is a thread denoted by the variable "owner" of the time slot data B.

Figure 8:
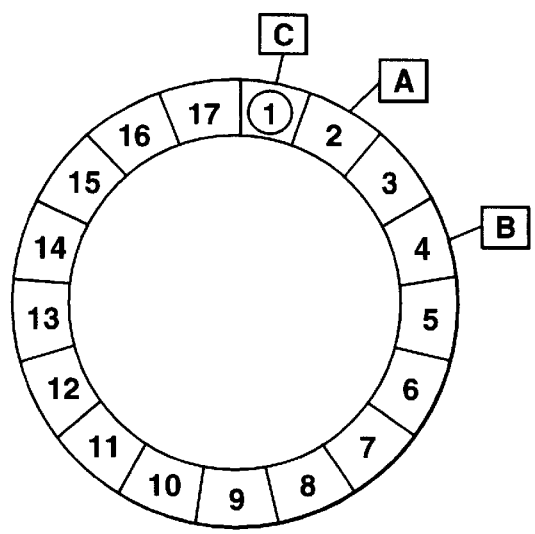
FIG. 8 is a diagram showing the time slot data A, B, and C shifted from the waiting pattern shown in FIG. 7.

When the processing time assigned to the time slot data B has been consumed, the time slot data B is queued to a forward wait queue determined by its priority level. More particularly, as the priority level of the thread B is 13, the time slot data B is queued to a forward wait queue advanced by (16−13)=3 from the current wait queue, i.e. the fourth wait queue as shown in FIG. 8.

Then, a further processing time of the CPU is assigned to the time slot data C in the first wait queue which succeeds the time slot data B, permitting the execution of the thread C corresponding to the time slot data C to be started. The thread C corresponding to the time slot data C is a thread denoted by the variable "owner" of the time slot data C.

Figure 9:
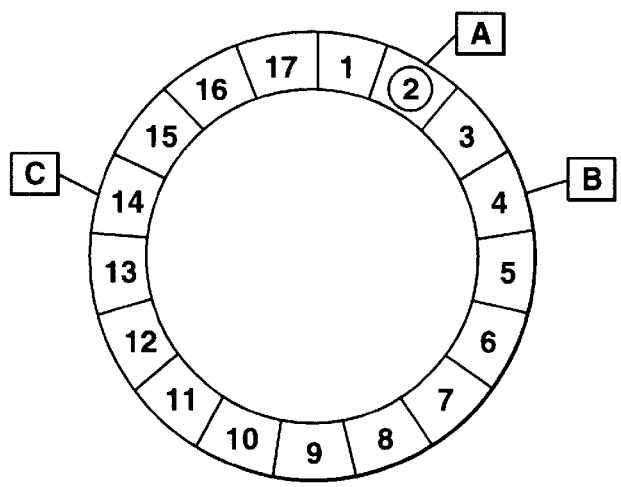
FIG. 9 is a diagram showing the time slot data A, B, and C shifted from the waiting pattern shown in FIG. 8.

As the further processing time assigned to the time slot data C has been consumed, the time slot data C is queued to a forward wait queue determined by its priority level. More particularly, as the priority level of the thread C is 3, the time slot data C is queued to a forward wait queue advanced by (16−3)=13 from the current wait queue, i.e. the fourteenth wait queue as shown in FIG. 9.

Figure 10:
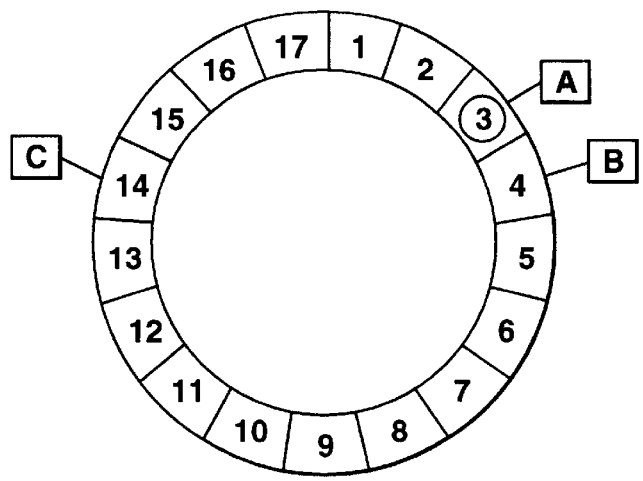
FIG. 10 is a diagram showing the time slot data A, B, and C shifted from the waiting pattern shown in FIG. 9.

The processing of the time slot data queued in the first wait queue is now completed. Then, the processing of time slot data queued in the second wait queue follows. As the time slot data A is located at the top of the second wait queue, a processing time of the CPU is assigned to the time slot data A hence allowing the execution of the thread A corresponding to the time slot data A to be started. When the processing time assigned to the time slot data A has been consumed, the time slot data A is queued to a forward wait queue determined by its priority level. More specifically, as the priority level of the thread A is 15, the time slot data A is queued to a forward wait queue advanced by (16−15)=1 from the second wait queue, e.g. the third wait queue as shown in FIG. 10.

Figure 11:
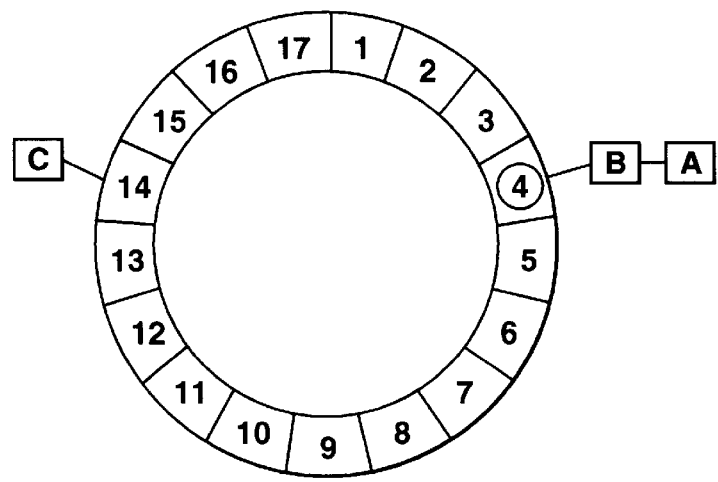
FIG. 11 is a diagram showing the time slot data A, B, and C shifted from the waiting pattern shown in FIG. 10.

The processing of the time slot data queued in the second wait queue is now completed. Similarly, the processing of time slot data queued in the third wait queue follows. As the time slot data A is located at the top of the third wait queue, another processing time of the CPU is assigned to the time slot data A hence allowing the execution of the thread A corresponding to the time slot data A to be started. When the another processing time assigned to the time slot data A has been consumed, the time slot data A is queued to a forward wait queue determined by its priority level. More specifically, as the priority level of the thread A is 15, the time slot data A is queued to a forward wait queue advanced by (16−15)=1 from the third wait queue, e.g. the fourth wait queue as shown in FIG. 11. Remember that the time slot data B is queued in the fourth wait queue. The time slot data A is thus linked to the trailing end of the time slot data B.

Figure 12:
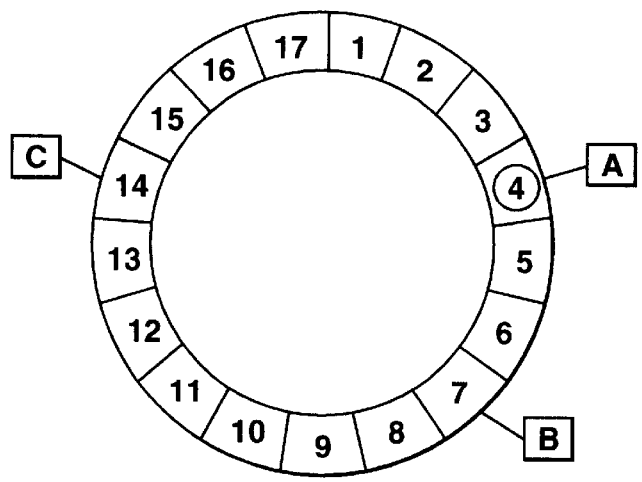
FIG. 12 is a diagram showing the time slot data A, B, and C shifted from the waiting pattern shown in FIG. 11.

The processing of the time slot data queued in the third wait queue is now completed. Then, the processing of time slot data queued in the forth wait queue follows. As the time slot data B is located at the top of the fourth wait queue, a further processing time of the CPU is assigned to the time slot data B hence allowing the execution of the thread B corresponding to the time slot data B to be started. When the further processing time assigned to the time slot data B has been consumed, the time slot data B is queued to a forward wait queue determined by its priority level. More specifically, as the priority level of the thread B is 13, the time slot data B is queued to a forward wait queue advanced by (16−13)=3 from the fourth wait queue, e.g. the seventh wait queue as shown in FIG. 12.

Figure 13:
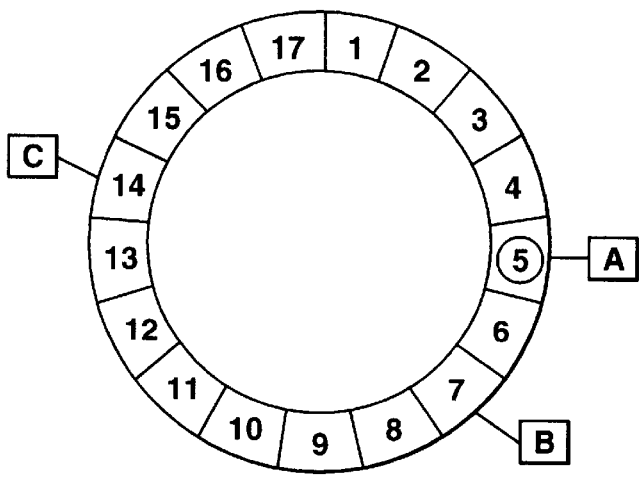
FIG. 13 is a diagram showing the time slot data A, B, and C shifted from the waiting pattern shown in FIG. 12; while FIGS. 14 and 15 illustrating waiting patterns up to the seventeenth wait queue.

Then, a further processing time of the CPU is assigned to the time slot data A which follows the time slot data B in the fourth wait queue, allowing the execution of the thread A corresponding to the time slot data A to be started. When the further processing time assigned to the time slot data A has been consumed, the time slot data A is queued to a forward wait queue determined by its priority level. More particularly, as the priority level of the thread A is 15, the time slot data A is queued to a forward wait queue advanced by (16−15)=1 from the fourth wait queue, e.g. the fifth wait queue as shown in FIG. 13.

In the same manner, a processing time of the CPU is assigned one by one to time slot data queued in each wait queue, thus allowing the execution of a thread corresponding to the time slot data to be started. When the processing time assigned to the time slot data has been consumed, the time slot data is queued to a forward wait queue determined by its priority level. When the processing execution is repeated and completed with the seventeenth wait queue, it returns back to the first wait queue.

Figure 14:
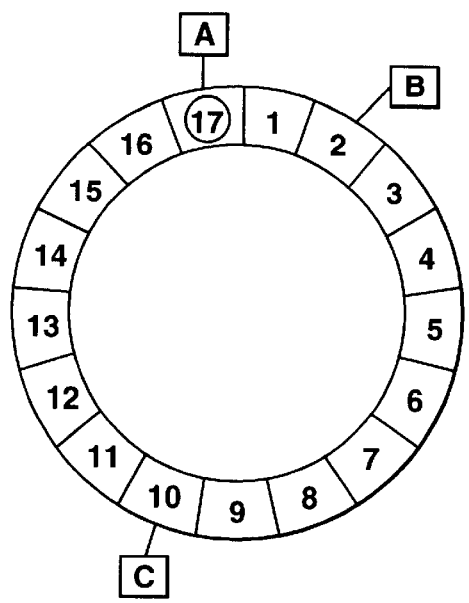
FIG. 14 is a diagram showing the time slot data A queued in the seventeenth wait queue.
Figure 15:
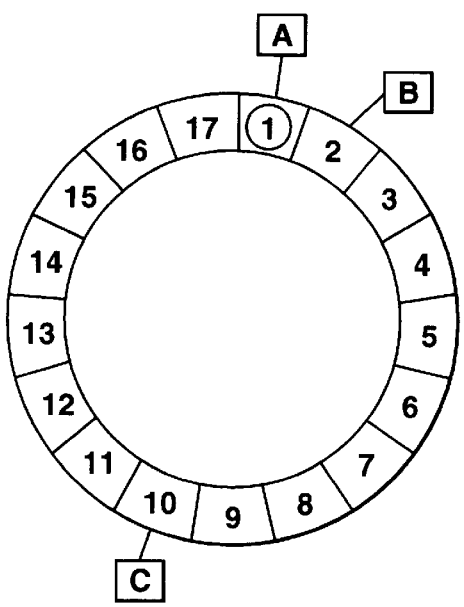
FIG. 15 is a diagram showing the time slot data A, B, and C shifted from the waiting pattern shown in FIG. 14; while FIGS. 16 to 25 illustrating waiting patterns over the wait queues when the priority inheritance is involved.

As shown in FIG. 14, in case that the time slot data A is queued to the seventeenth wait queue and a processing time of the CPU is assigned to the time slot data A permitting the execution of the thread A corresponding to the time slot data A to be started, the time slot data A when having consumed its assigned processing time is queued to a forward wait queue determined by its priority level. More specifically, as the priority level of the thread A is 15, the forward wait queue is one advanced by (16−15)=1 from the current wait queue. Since the current wait queue is the seventeenth, the forward wait queue is the first wait queue. As a result, the time slot data A is queued to the first wait queue as shown in FIG. 15.

During the processing execution, the ratio of occupation of the processing time of the CPU between the threads A, B and C is 1:1/3:1/13. In other words, the processing time of the CPU is allocated to the threads depending on the priority levels of the time slot data specifying the threads, hence enabling the time-sharing processing of the threads.

In most conventional time-slice scheduling operations, it is needed to perform sorting of the wait queues in relation to the sharing of the processing time of the CPU. On the contrary, the method of the present invention allows the time-slice scheduling to be executed simply by modifying the linkage of the time slot data. Using the method, the time-slice scheduling can be conducted through a far less amount of computation.

In case that the method is applied to a real-time system which stands only when each processing execution has to be finished within a given period of time, the number of time slot data queued in the scheduling wait queues may be limited. As the number of time slot data queued in the wait queues is properly controlled, the occupation of the processing time of the CPU can be optimized. This makes the method applicable to any real-time system.

It is assumed that the thread A has the highest level of priority and the completion of the execution of the thread A requires two time units of the CPU processing time. Also, the execution of the thread A has to be completed within five time units. At a time when one time unit of the CPU processing time is left before the execution of the thread A is completed, the thread A situated as shown in FIG. 10 is changed to a state shown in FIG. 11. Then, there has to wait for one time unit of the CPU processing time before another processing time is imparted to the thread A (in order to allow the processing of the thread B). Apparently, the execution of the thread A is completed at the next cycle. However, in case that the wait queue where the thread B situated as shown in is queued contains five threads, the thread A has to wait for five time units of the CPU processing time until a processing time of the CPU is imparted to the thread A. This period of time exceeds the time units reserved for completion of the execution of the thread A. For compensation, the number of threads queued in one wait queue may be limited by a wait queue theory to such a value that the execution of the thread A can be completed within its predetermined time units.

4-2 When Priority Inheritance is Involved

An example when the priority inheritance is involved in the time-sharing processing of a thread A having a priority level of 15, a thread B having a priority level of 13, and a thread C having a priority level of 3 is now explained referring to FIGS. 16 to 26.

In FIGS. 16 to 26, the alphabet in a parenthesis represents a thread denoted by the variable "owner" of a time slot data. For example, A(A) means that the variable owner" of the time slot data A indicates the thread A. A(B) means that the variable "owner" of the time slot data A indicates the thread B.

Figure 16:
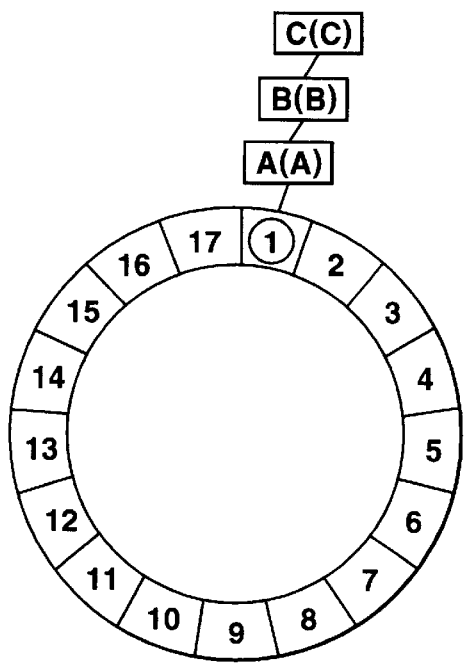
FIG. 16 is a diagram showing the time slot data A, B, and C queued in the first wait queue.
Figure 17:
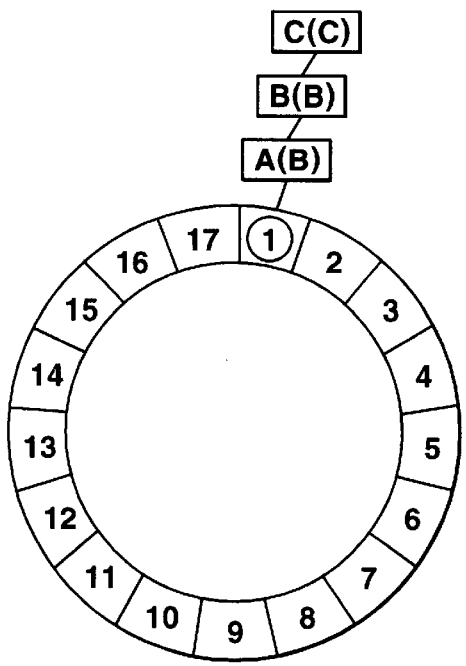
FIG. 17 is a diagram showing the time slot data A, B, and C shifted from the waiting pattern shown in FIG. 16.

In this example similar to that shown in FIGS. 6 to 15, the times slot data A, B, and C are queued in the first wait queue as shown in FIG. 16. A processing time of the CPU is first assigned to the time slot data A which is located at the top of the first wait queue hence allowing the execution of the thread A corresponding to the time slot data A to be started. It is however assumed in this example that the thread A has to wait for the completion of the execution of the thread B. Then, the execution of the thread A is suspended and the procedure shown in the flowchart of FIG. 3 follows. As a result, while the thread A is kept in its wait state, the variable "owner" of the time slot data A is modified to indicate the thread B, as shown in FIG. 17, permitting the execution of the thread B to be started. More specifically, the linkage of the time slot data A is switched from the thread A to the thread B and the processing time of the CPU imparted to the thread A is assigned to the thread B.

Figure 18:
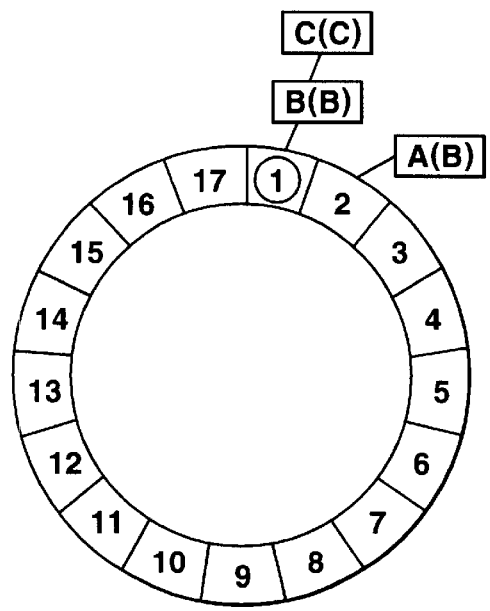
FIG. 18 is a diagram showing the time slot data A, B, and C shifted from the waiting pattern shown in FIG. 17.

When the processing time assigned to the time slot data A has been consumed, the time slot data A is queued to a forward wait queue determined by its priority level. More specifically, as the priority level of the thread A is 15, the time slot data A is queued to a forward wait queue advanced by (16−15)=1 from the first wait queue, e.g. the second queue as shown in FIG. 18.

Then, another processing time of the CPU is assigned to the time slot data B which follows the time slot data A in the first wait queue, hence allowing the execution of the thread B corresponding to the time slot data B to be started. The thread corresponding to the time slot data B is one denoted by the variable "owner" of the time slot data B and in this example, the thread B.

Figure 19:
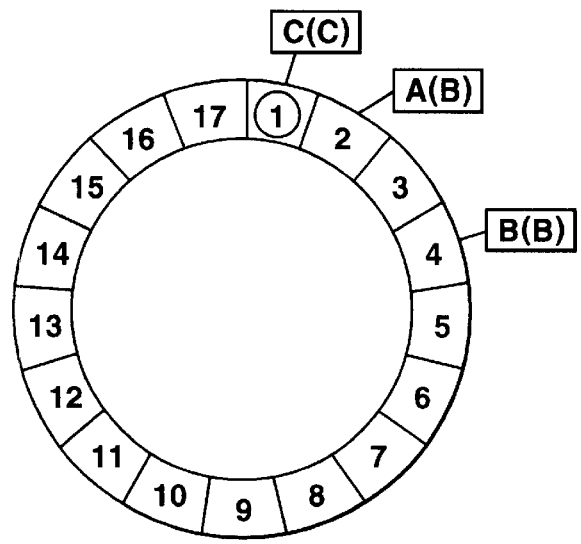
FIG. 19 is a diagram showing the time slot data A, B, and C shifted from the waiting pattern shown in FIG. 18.

When the another processing time assigned to the time slot data B has been consumed, the time slot data B is queued to a forward wait queue determined by its priority level. More specifically, as the priority level of the thread B is 13, the time slot data B is queued to a forward wait queue advanced by (16−13)=3 from the first wait queue, e.g. the fourth wait queue as shown in FIG. 19.

A further processing time of the CPU is assigned to the next time slot data C in the first wait queue thus allowing the execution of the thread C corresponding to the time slot data C to be started. The thread corresponding to the time slot data C is one denoted by the variable "owner" of the time slot data C and in this example, the thread C.

Figure 20:
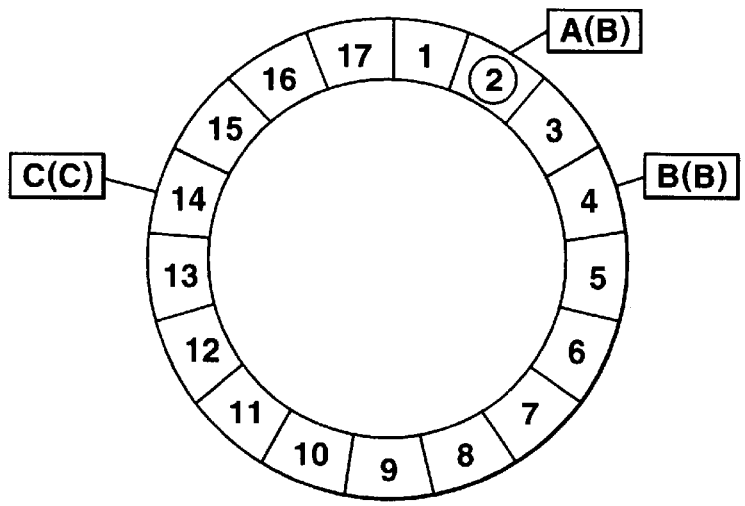
FIG. 20 is a diagram showing the time slot data A, B, and C shifted from the waiting pattern shown in FIG. 19.

When the further processing time assigned to the time slot data C has been consumed, the time slot data C is queued to a forward wait queue determined by its priority level. More specifically, as the priority level of the thread C is 3, the time slot data C is queued to a forward wait queue advanced by (16−3)=13 from the first wait queue, e.g. the fourteenth wait queue as shown in FIG. 20.

Figure 21:
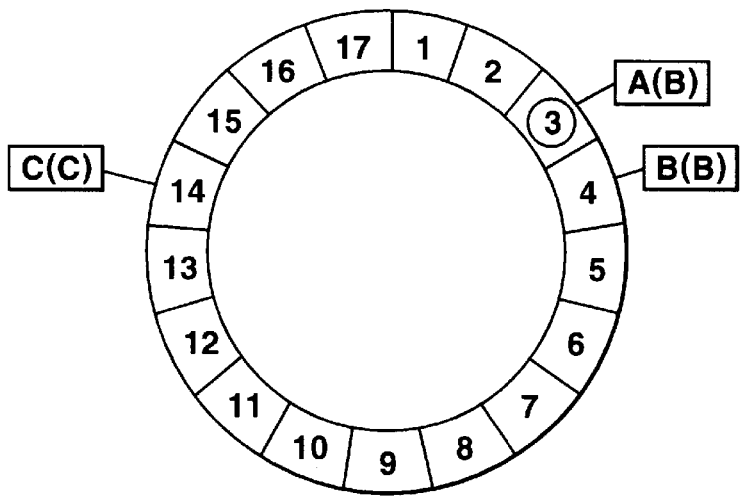
FIG. 21 is a diagram showing the time slot data A, B, and C shifted from the waiting pattern shown in FIG. 20.

The processing of the time slot data queued in the first wait queue is now completed. Then, the processing of time slot data queued in the second wait queue follows. As the time slot data A is queued at the top of the second wait queue, the execution of the thread denoted by the variable "owner" of the time slot data A which is the thread B in this example is started. When the processing time assigned to the time slot data A has been consumed, the time slot data A is queued to a forward wait queue determined by its priority level. More particularly, as the priority level of the thread A is 15, the time slot data A is queued to a forward wait queue advanced by (16−15)=1 from the second wait queue, e.g. the third wait queue as shown in FIG. 21.

Figure 22:
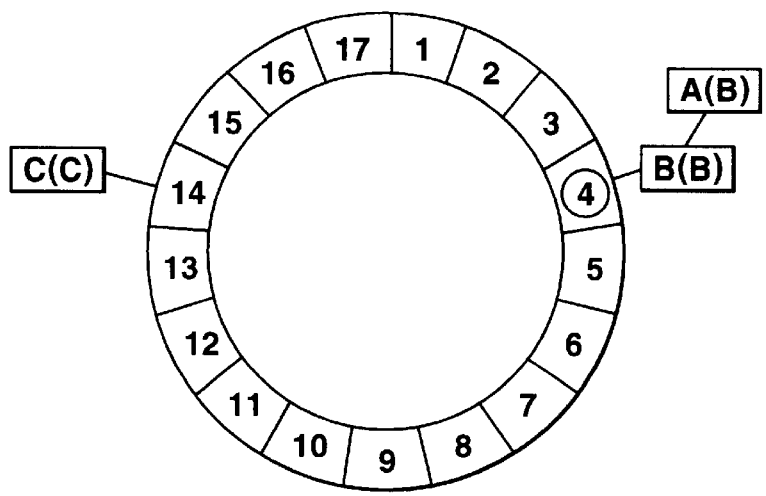
FIG. 22 is a diagram showing the time slot data A, B, and C shifted from the waiting pattern shown in FIG. 21.

The processing of the time slot data queued in the second wait queue is now completed. Then, the processing of time slot data queued in the third wait queue follows. As the time slot data A is queued at the top of the third wait queue, the execution of the thread denoted by the variable "owner" of the time slot data A which is the thread B is started. When the processing time assigned to the time slot data A has been consumed, the time slot data A is queued to a forward wait queue determined by its priority level. More particularly, as the priority level of the thread A is 15, the time slot data A is queued to a forward wait queue advanced by (16−15)=1 from the third wait queue, e.g. the fourth wait queue as shown in FIG. 22. Remember that the time slot data B is present in the fourth wait queue. Hence, the time slot data, A is linked to the trailing end of the time slot data B.

The processing of the time slot data queued in the third wait queue is now completed. Then, the processing of time slot data queued in the fourth wait queue follows. At the time, the time slot data B is queued at the top of the fourth wait queue, the execution of the thread denoted by the variable "owner" of the time slot data B which is the thread B in this example is started.

Figure 23:
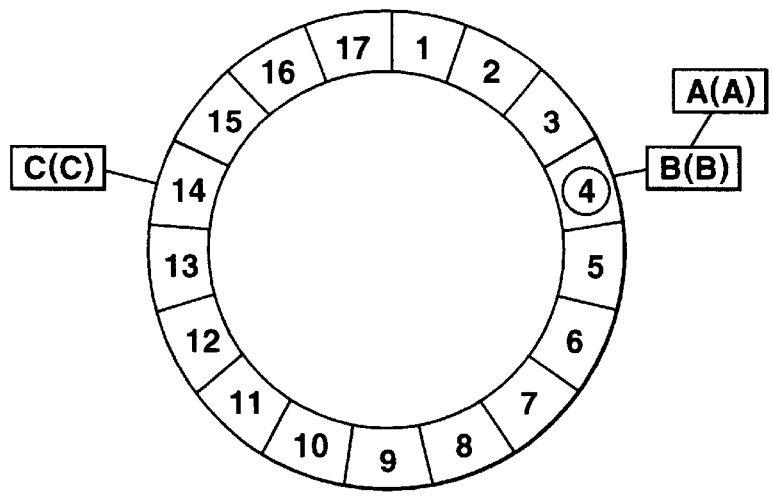
FIG. 23 is a diagram showing the time slot data A, B, and C shifted from the waiting pattern shown in FIG. 22.

Assuming that the cause for maintaining the thread A in its wait state is eliminated by the execution of the thread B, the procedure shown in the flowchart of FIGS. 4 and 5 is performed. As a result, the thread A is changed to the ready state and simultaneously, the variable "owner" of the time slot data A is modified to indicate the thread A as shown in FIG. 23. In other words, the linkage of the time slot data A is transferred back to the thread A.

Figure 24:
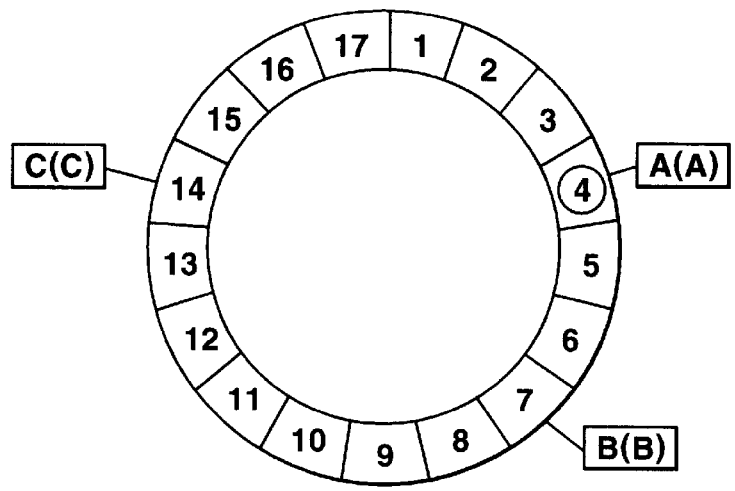
FIG. 24 is a diagram showing the time slot data A, B, and C shifted from the waiting pattern shown in FIG. 23.

When the processing time assigned to the time slot data B has been consumed, the time slot data B is queued to a forward wait queue determined by its priority level. More particularly, as the priority level of the thread B is 13, the time slot data B is queued to a forward wait queue advanced by (16−13)=3 from the fourth wait queue, e.g. the seventh wait queue as shown in FIG. 24.

Then, a processing time of the CPU is assigned to the time slot data A which follows the time slot data B in the fourth wait queue, permitting the execution of the thread A corresponding to the time slot data A to be started. The thread corresponding to the time slot data A is one denoted by the variable "owner" of the time slot data A which is the thread A.

Figure 25:
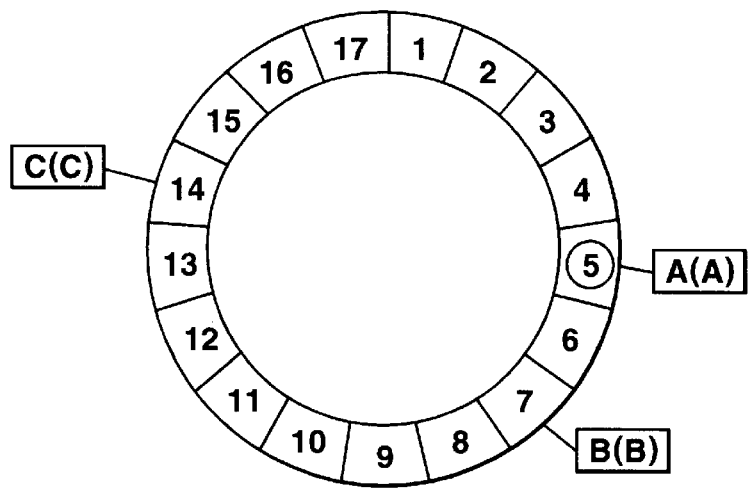
FIG. 25 is a diagram showing the time slot data A, B, and C shifted from the waiting pattern shown in FIG. 24.

When the processing time assigned to the time slot data A has been consumed, the time slot data A is queued to a forward wait queue determined by its priority level. More particularly, as the priority level of the thread A is 15, the time slot data A is queued to a forward wait queue advanced by (16−15)=1 from the fourth wait queue, e.g. the fifth wait queue as shown in FIG. 25.

In the same manner, time slot data in each wait queue are processed and the time slot data when having consumed its assigned processing time is queued to a forward wait queue determined by its priority level.

5. Conclusion

In the scheduling method of the present invention, while a higher priority thread which has to wait for the completion of the execution of a lower priority thread is maintained in its wait state, the value denoted by the variable "owner" of a time slot data specifying the higher priority thread is switched from the higher priority thread to the lower priority thread. More particularly, the linkage of the time slot data specifying the higher priority thread is temporarily switched from the higher priority thread to the lower priority thread.

In other words, the scheduling method of the present invention when a higher priority thread has to wait for the completion of the execution of a lower priority thread resolves the drawback of priority inversion by handling the lower priority thread instead of the higher priority thread but not by increasing the priority level of the lower priority thread.

In the scheduling method of the present invention, when the higher priority thread has to wait for the completion of the execution of the lower priority thread, such troublesome operations as modifying the wait queue or recalculating the priority level for priority inheritance are not needed to have the effect that the priority level is transferred from the higher priority thread to the lower priority thread. Accordingly, the scheduling method is advanced to resolve the drawback of priority inversion which may be critical in the real-time system. Also, without modifying the wait queue nor recalculating the priority level for priority inheritance, the scheduling method will avoid increase of the cost in eliminating the drawback of priority inversion. Moreover, the scheduling method allows the processing time of the CPU imparted to a thread at its wait state to be assigned to an interrupting thread which causes the wait state of the thread, hence ensuring the optimum use of the processing time of the CPU without loss.

In the scheduling method of the present invention, when the wait state is repeated (for example, the thread A waiting for the execution of the thread B and the thread B waiting for the execution of the thread C), each corresponding time slot data is linked to the thread located at the top of the wait queue. Accordingly, the entire processing time of the CPU can be consumed at higher efficiency. More specifically, the waiting for a plurality of threads which is not allowed by the other conventional priority inheritance methods can successfully be implemented.

Figure 26:
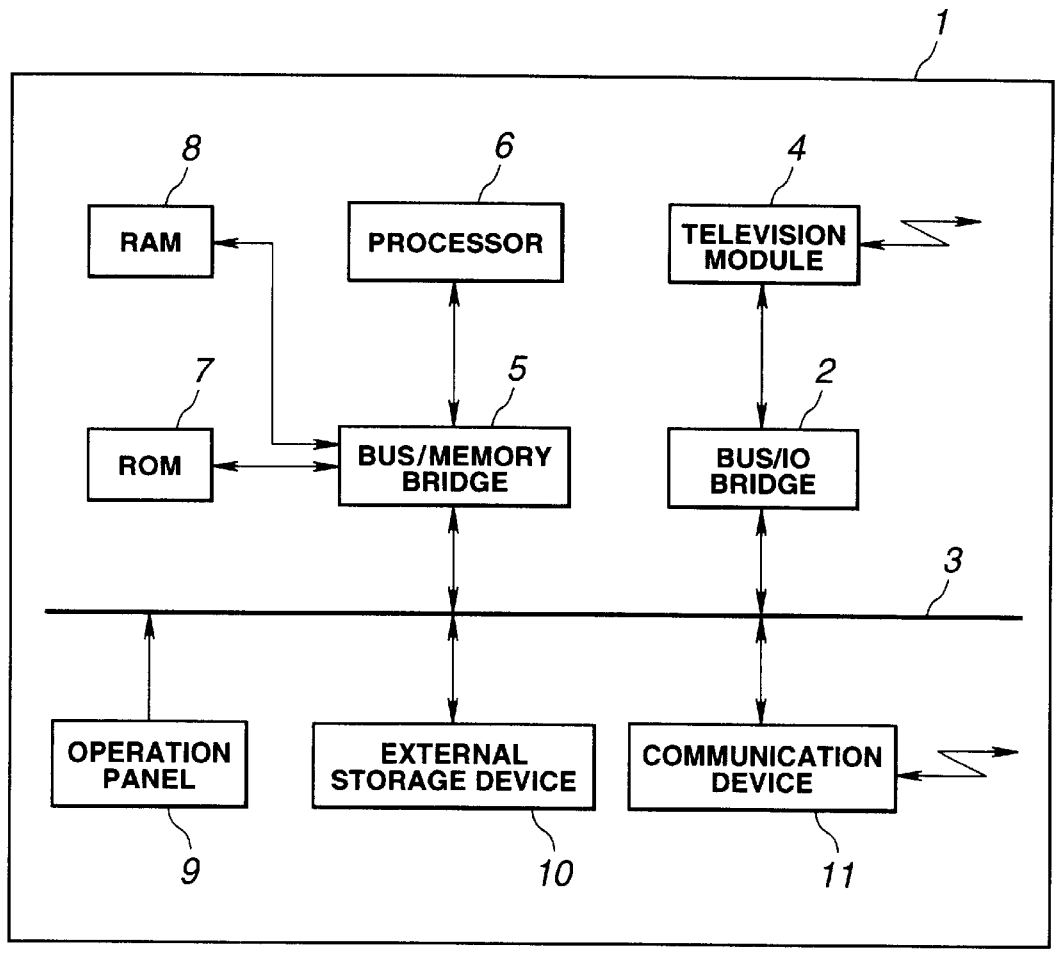
FIG. 26 is a schematic block diagram of a television receiver illustrating as one embodiment of the present invention.

Finally, a hardware arrangement and an operating system to which the present invention is applicable will be described referring to FIGS. 26 and 27. Although FIG. 26 illustrates a television receiver 1 to which the present invention is applied, it should be understood that the present invention is applicable to other data processing apparatuses. More specifically, the present invention is applicable to a variety of available data processing apparatuses equipped with an operating system (referred to as an OS hereinafter)

which employs a multi-thread time-sharing processing system, including audio/video (A/V) appliances, office data processors, and computers.

The television receiver 1 shown in FIG. 26 is an apparatus for when receiving signals transmitted via an antenna or over a cable from broadcasting stations, displaying an image on a display device and emitting its associated sounds from a loudspeaker(s) which are reproduced from the signals.

The television receiver 1 has not only a common television receiver function but also a function for receiving programs and other data from the outside. As shown in FIG. 26, the television receiver 1 comprises a television receiver module 4 connected via a bus/IO bridge 2 to a bus 3, a processor 6 connected via a bus/memory bridge 5 to the bus 3, a ROM (read only memory) 7 and a RAM (random access memory) 8 both connected via the bus/memory bridge 5 to the bus 3, and an operation panel 9, an external storage device 10, and a communication device 11 all connected to the bus 3.

The television receiver module 4 has a function for reproducing an image and its associated sounds from the signals received at the antenna or over the cable. The television receiver module 4 is connected via the bus/IO bridge 2 to the bus 3 for exchanging signals with the other components.

The processor 6 controls the execution of each component in the television receiver 1 and is connected via the bus/memory bridge 5 to the bus 3. Also, the processor 6 is connected via the bus/memory bridge 5 to the ROM 7 and the RAM 8. The ROM 7 may save fixed information for the television receiver 1. The RAM 9 provides a memory space which is used as a work area of the processor 6. More particularly, the processor 6 runs an OS (including the scheduling apparatus and method of the present invention) and application programs saved in the external storage device 10, which will be explained later, while utilizing the RAM 8 as its work area, for controlling the execution of the components in the television receiver 1.

The operation panel 9 is an input device for accepting manual input from a user. The operation panel 9 permits, for example, command signals directing the switching of channels and volumes to enter the television receiver 1. The operation panel 9 may be embodied substantially by an input device having a plurality of button switches for entry of the command signals and a pointing device such as a mouse. The command signals input from the operation panel 9 are supplied via the bus 3 and the bus/memory bridge 5 to the processor 6. In response to the command signals from the operation panel 9, the processor 6 performs arithmetical operations to control the execution of the components in the television receiver 1.

The external storage device 10 may be a hard disk drive in which the OS (including the scheduling apparatus and method of the present invention) and the application programs for controlling the executions are stored. Also, in the external storage device 10, relevant video data, control data, and other programs downloaded via the communication device 11 from the outside are saved. The communication device 11 is an input/output block for data communications with the outside and may be a modem or a terminal adapter.

The television receiver 1 directs the processor 6 to run the OS stored in the external storage device 10 to execute the application programs saved in the external storage device 10 with the use of control information saved in the ROM 7, hence controlling the execution of the components. The external storage device 10 in the television receiver 1 serves as a program providing medium for providing a set of programs of the OS (including the scheduling apparatus and method of the present invention) for data processing.

The OS including the scheduling apparatus and method of the present invention may be stored in the ROM 7 or the RAM 8. In that case, the ROM 7 or the RAM 8 acts as the program providing means. It is however desirable for rewriting the OS e.g. for version up to have the OS including the scheduling apparatus and method of the present invention stored in a rewritable recording medium. The program providing medium may be a magnetic or optical recording medium detachably loaded into the television receiver 1 or a network circuit for connecting the television receiver 1 to other data processing apparatuses.

The OS installed in the television receiver 1 is an exclusively object-oriented operating system. Using the OS, the application programs e.g. for displaying an image on the television receiver module 4 or for implementing a graphical user interface (GUI) to control the operation panel 9 are performed.

Figure 27:
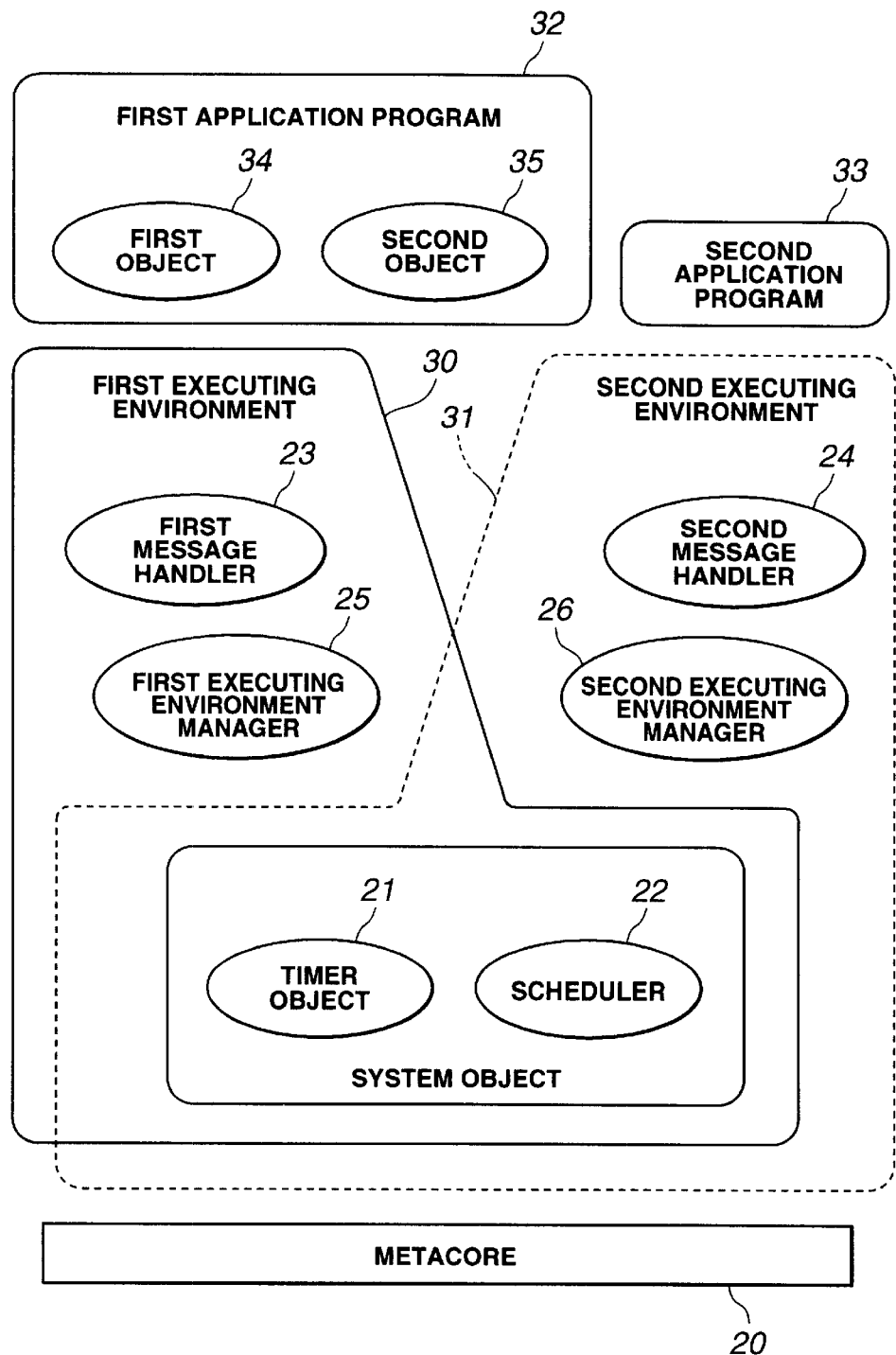
FIG. 27 is a schematically explanatory diagram of an operating system according to the present invention.

An example of the OS is now explained referring to FIG. 27. The example of the OS consists mainly of a MetaCore 20 as a basic part and groups of objects. The MetaCore 20 is not defined as the object and includes a process for switching between the objects to be executed or more specifically for initiating the execution of a thread to which that a processing time is assigned by the method of the present invention. This exclusively object-oriented OS is featured in which the executing mechanism of the objects constructing the application programs which are executed on the OS is identical to that of the objects constructing the OS. Each of the objects in the OS has a thread and the objects can be performed in parallel. The objects can also communicate with each other through exchanging messages. However, a particular one of the objects called a system object can communicate without using any message and is guaranteed to run separately regardless of the scheduling method of the present invention. Also, the system object is permitted to directly handle a specific data structure. Such specific data structure may be a thread or a time slot data according to the present invention.

As shown in FIG. 27, there are provided, in addition to the MetaCore 20, a timer object 21 and a scheduler 22 which both serve as the system objects, and a first message handler 23, a second message handler 24, a first executing environment manager 25, and a second executing environment manager 26 which all serve as the other objects. It would be apparent that the system arrangement shown in FIG. 27 actually includes more objects (including the system objects) other than the illustrated objects.

It is possible in the OS that the applications are executed in different environments. The embodiment of the present invention illustrates that the two applications are performed in two different environments respectively. More specifically, a first application 32 runs in a first executing environment 30 which includes the timer object 21, the scheduler 22, the first message handler 23, and the first executing environment manager 25. A second application 33 runs in a second executing environment 31 which includes the timer object 21, the scheduler 22, the second message handler 24, and the second executing environment manager 26. The first 32 and the second application 33 comprise groups of the objects. In particular, the first application 32 includes a first object 34 and a second object 35. It is then assumed that the priority level of the first object 34 is lower than that of the second object 35.

The description of a procedure of switching from one thread to another according to the present invention follows. It is assumed that the first object 34 in the first application 32 sends a process request message to the second object 35. The message is transmitted via the first message handler 23 to the second object 35. The first message handler 23 compares the priority level of the first object 34 as a sender with the priority level of the second object 35 as a receiver to detect an occurrence of priority inversion. Upon detecting the priority inversion, the first message handler 23 calls the function "makeWait (Thread* target, Thread* depend)". The argument "target" indicates the thread of the first object 23 while the argument "depend" indicates the thread of the second object 35. Accordingly, the time slot data specifying the thread of the first object 34 is transferred to the thread of the second object 35.

When the execution of the second object 35 requested by the process request message of the first object 34 has been finished, a reply message is sent to the first object 34. The reply message is also transmitted via the first message handler 23. The first message handler 23 then detects that the first object 34 is in its wait state as depends on the execution of the second object 35. Upon detecting so, the first message handler 23 calls the function "makeReady (Thread* target)". The argument "target" indicates the thread of the first object 34. Accordingly, the time slot data transferred to the thread of the second object 35 is returned back to the thread of the first object 34.

The time-sharing scheduling is explained. In the time-sharing scheduling, the timer object 21 triggers timer interruption at equal intervals of a given time and calls the scheduler 22. The scheduler 22 selects the time slot data specifying a thread to be executed in sequence according to the previously described manner and initiates the thread of the selected object.

What is claimed is:

1. A scheduling apparatus for an operating system capable of time-sharing processing a plurality of executable subjects, comprising:
   means for storing a time slot data assigned to each of the executable subjects as an object to be scheduled;
   a scheduler for imparting a processing time to the time slot data and conducting time-sharing scheduling;
   means for executing the executable subject specified by the time slot data to which the processing time is imparted;
   means for assigning the time slot data specifying a first executable subject to a second executable subject when said first executable subject has a higher priority level than said second executable subject and said first executable subject has to wait for completion of the execution of said second executable subject; and
   means for re-assigning the time slot data specifying the first executable subject to said first executable subject when the execution of said second executable subject is completed.

2. A scheduling apparatus according to claim 1, wherein the time slot data includes link data which represents the executable subject to which the time slot data is assigned and wherein said scheduling apparatus further comprises:
   means for shifting the executable subject specified by the link data of the time slot data from the higher priority executable subject to the lower priority executable subject when the time slot data specifying the higher priority executable subject is handled as a time slot data assigned to the lower priority executable subject.

3. A scheduling apparatus for an operating system capable of time-sharing processing a plurality of executable subjects having respective priority levels, comprising:
   means for storing a time slot data assigned to each of the executable subjects as an object to be scheduled;
   a scheduler for imparting a processing time to the time slot data and conducting time-sharing scheduling;
   a ring buffer comprised of a plurality of wait queues, each having at least one time slot data allocatable thereto;
   means for executing the executable subject specified by the time slot data to which the processing time is imparted;
   positioning means for determining one of the wait queues in the ring buffer to which the time slot data is allocated as a function of the priority level of the executable subject specified by the time slot data;
   means operable, when a time slot data is to be allocated to the determined wait queue in the ring buffer, to allocate the time slot data to the last of the wait queues in the ring buffer; and
   means for imparting the processing time to the time slot data located at the top of the wait queue in the ring buffer.

4. A scheduling apparatus according to claim 3, wherein the time slot data includes data representing the priority level of the executable subject specified by the time slot data, and
   the positioning means is operable, when the time slot data of the executable subject which has consumed the processing time imparted to it is allocatable to the wait queue in the ring buffer, to allocate the time slot data to a wait queue in the ring buffer which is distanced from the wait queue where the time slot data currently is saved, by a difference between one less than the number of wait queues in the ring buffer and the priority level of the allocatable time slot data.

5. A scheduling method for use with an operating system capable of time-sharing processing a plurality of executable subjects, comprising the steps of:
   imparting a processing time to a time slot data which is assigned to each of the executable subjects as an object to be scheduled and conducting time-sharing scheduling;
   executing the executable subject specified by the time slot data to which the processing time is imparted;
   assigning the time slot data specifying a first executable subject to a second executable subject when said first executable subject has a higher priority level than said second executable subject and said first executable subject has to wait for completion of the execution of said second executable subject; and
   re-assigning the time slot data specifying the first executable subject to said first executable subject when the execution of said second executable subject is completed.

6. A scheduling method according to claim 5, wherein the time slot data includes link data which represents the executable subject to which the time slot data is assigned, and shifting the executable subject specified by the link data from the higher priority executable subject to the lower priority executable subject when the time slot data for the higher priority executable subject is handled as a time slot data assigned to the lower priority executable subject.

7. A scheduling method for use with an operating system capable of time-sharing processing a plurality of executable subjects having respective priority levels, comprising the steps of:

imparting a processing time to a time slot data which is assigned to each of the executable subjects as an object to be scheduled and conducting time-sharing scheduling;

executing the executable subject specified by the time slot data to which the processing time is imparted;

determining one of wait queues provided in a ring buffer to which the time slot data is allocated, as a function of the priority level of the executable subject specified by the time slot data;

allocating the time slot data to the last of the wait queues in the ring buffer when a time slot data is to be allocated to the determined wait queue in the ring buffer; and imparting the processing time to the time slot data located at the top of the wait queue in the ring buffer.

8. A scheduling method according to claim 7, wherein the time slot data includes data representing the priority level of the executable subject, and when the time slot data of the executable subject which has consumed the processing time imparted to it is allocatable to the wait queue in the ring buffer, allocating the time slot data to a wait queue in the ring buffer which is distanced from the wait queue where the time slot data currently is saved, by a difference between one less than the number of wait queues in the ring buffer and the priority level of the allocatable time slot data.

9. A recording medium on which is recorded a data processing program for a computer operating system capable of time-sharing processing a plurality of executable subjects, said data processing program controlling the computer operating system to:

impart a processing time to a time slot data which is assigned to each of the executable subjects as an object to be scheduled and conducting time-sharing scheduling;

execute the executable subject specified by the time slot data to which the processing time is imparted;

assign the time slot data specifying a first executable subject to a second executable subject when said first executable subject has a higher priority level than said second executable subject and said first executable subject has to wait for completion of the execution of said second executable subject; and re-assign the time slot data specifying the first executable subject to said first executable subject when the execution of said executable subject is completed.

10. A recording medium according to claim 9, wherein the time slot data includes link data which represents the executable subject to which the time slot data is assigned, and wherein the data processing program shifts the executable subject specified by the link data from the higher priority executable subject to the lower priority executable subject when the time slot data specifying the higher priority executable subject is handled as a time slot data assigned to the lower priority executable subject.

11. A recording medium on which is recorded a data processing program for a computer operating system capable of time-sharing processing a plurality of executable subjects, said data processing program controlling the computer operating system to:

impart a processing time to a time slot data which is assigned to each of the executable subjects as an object to be scheduled and conducting time-sharing scheduling;

execute the executable subject specified by the time slot data to which the processing time is imparted;

determine one of wait queues provided in a ring buffer to which the time slot data is allocated, as a function of the priority level of the executable subject specified by the time slot data;

allocate the time slot data to the last of the wait queues in the ring buffer when a time slot data is to be allocated to the determined wait queue in the ring buffer; and impart the processing time to the time slot data located at the top of the wait queue in the ring buffer.

12. A recording medium according to claim 11, wherein the time slot data includes data representing the priority level of the executable subject, and when the time slot data of the executable subject which has consumed the processing time imparted to it is allocatable to the wait queue in the ring buffer, allocating the time slot data to a wait queue in the ring buffer which is distanced from the wait queue where the time slot data currently is saved, by a difference between one less than the number of wait queues in the ring buffer and the priority level of the allocatable time slot data.

* * * * *